United States Patent [19]

Chudleigh, Jr.

[11] Patent Number: 5,289,188
[45] Date of Patent: Feb. 22, 1994

[54] HIGH RESOLUTION RADAR SYSTEM FOR HIGH SPEED AND SATELLITE VEHICLES

[75] Inventor: Walter H. Chudleigh, Jr., Norristown, Pa.

[73] Assignee: Ceridian Corporation, Minneapolis, Minn.

[21] Appl. No.: 295,283

[22] Filed: Jul. 10, 1963

[51] Int. Cl.⁵ .................................... G01S 13/28
[52] U.S. Cl. ........................ 342/58; 342/25; 342/132; 342/189; 342/352
[58] Field of Search ............... 343/17.2, 100.7, 5 DP, 343/100 SAT; 342/58, 132, 189, 352

[56] References Cited
U.S. PATENT DOCUMENTS 2,941,202  6/1960  Harris, Jr. et al. .
3,046,545  7/1962  Westerfield .
3,121,868  2/1964  Hausz et al. .

Primary Examiner—T. H. Tubbesing
Attorney, Agent, or Firm—Kinney & Lange

[57] ABSTRACT

A radar system mounted on a satellite is scanned to provide surveillance of large areas such as the oceans. The transmitter oscillator generates bursts in the frequency range from about 20–250 megacycles. A receiver detects signals reflected from objects in the target area. The receiver enhances the value of recurrent components of selected time interval portions of the received signals. In one embodiment the transmitter bursts are modulated in accordance with a predetermined modulation pattern. The system determines to what extent it corresponds to the predetermined modulation pattern and then enhances the value of the recurrent components of the received signals. The enhancement is of those recurrent components having relative phases which change by substantially uniform increments.

10 Claims, 3 Drawing Sheets

HIGH RESOLUTION RADAR SYSTEM FOR HIGH SPEED AND SATELLITE VEHICLES

This invention relates to a radar system and in particular to a radar system in which the transmitter and the target area have relative motion between them which is at an extremely high velocity.

It would be extremely useful from a military standpoint to be able, with a limited number of artificial earth satellites or other extremely fast-moving equivalent structures, to maintain surveillance of all ships, for example, in the oceans and other waterways of the world. Such satellites must operate at long ranges because of their height. Long range radar operation generally requires high power and high angular resolution which in turn usually means heavy power supplies and large antennas. The weight and size of an artificial satellite is limited by the payload capacity of the rocket which sends it into orbit. There initially appears to be a serious conflict between performance and weight requirements in satellite-borne radars.

A technique that has been hitherto used to achieve adequate resolution with a small antenna is known as "Synthetic High Resolution" (S. H. R.). S. H. R. functions by using a small antenna and observing the R. F. phase (or relative time of occurrence) of the reflected signals as the small antenna moves through the space that would have been occupied by the large antenna. It behaves much as though there were a multiplicity of small antennas each receiving a signal simultaneously, the reflected signals being added together so that signals of the same R. F. phase reinforce each other and signals of opposite R. F. phase tend to cancel each other. With S. H. R. one small antenna is used sequentially in the many positions and the addition is performed sequentially. This requires that the single antenna move along a substantially straight line path during the interval of time over which signals from a single target are added.

To achieve a particular angular resolution, for instance, 1/500 of a radian, the radar installation or "platform" must move through a path equal to a particular number of wavelengths of the R. F. wave. For 1/500 radian resolution this number would be about 500 wavelengths. Additionally, the platform must depart from that straight line path by no more than a small fraction of a wavelength, for instance, ¼ wavelength. This implies that the platform must change its angular heading (in a gradual curve) by no more than 1/2000 of a radian over the 500 wavelength path, i.e., over a path length of 15 feet if the radiated signal is 30,000 megacycles, or over a path length of 150 feet if the radiated signal is at 3,000 megacycles. Thus, to obtain reasonable motion stability requirements known S. H. systems as used in aircraft have been operated at these higher radar frequencies.

However, S. H. R. imposes another requirement. The R. F. phase of signals reflected from a target changes at a rate proportional to platform velocity, R. F. frequency and the cosine of the angle between a ray connecting the platform with the target and a ray parallel with the direction of motion of the platform. Since S. H. R. achieves its angular resolution by comparing the R. F. phase of the returned echos from successive pulses, all targets whose echos change in R. F. phase by any integral number of 360° between successive pulses appear to be of substantially identical angular position. This results in an ambiguity in the determination of target azimuth known as "Doppler ambiguity". This ambiguity can be eliminated by using an antenna pattern narrow enough to illuminate only a set of targets that would not be confused with each other in angular position. It may be shown that the required antenna pattern varies inversely with frequency and hence the antenna must have a certain minimum length in the direction of motion of the radar platform. This certain minimum length is approximately twice the distance the radar platform moves in the interval of time between successive radar pulses.

At conventional airplane velocities, for instance, 600 miles per hour and conventional radar ranges, for instance, 100 miles, less than 1/500 second would elapse between successive radar pulses and the minimum antenna length would be on the order of 4 feet. In conventional applications an antenna 4 feet long in the direction of aircraft motion is a totally reasonable requirement.

However, at satellite velocities and ranges up to 400 miles (implying an interval of time between successive pulses of the order of 1/100 of a second) the required antenna length is several hundred feet long. As previously discussed this several hundred foot antenna has to be controlled in shape to a small fraction of a wavelength. At the radar frequencies conventionally used in S. H. R. (because of the aforementioned considerations related to uniformity of the platform velocity) the antenna shape would have to be controlled to within 1/16 of an inch at 30,000 megacycles and to within ⅝ of an inch at 3,000 megacycles, an obviously difficult requirement in ultra-lightweight antennas.

Furthermore, to utilize the S. H. R. data effectively and to perform the S. H. R. processing with any degree of simplicity, it becomes necessary to know the angular position of the antenna to within 1 beam width. At the radar frequencies conventionally used in S. H. R. for the aforementioned reasons related to uniformity of platform velocity and for an antenna several hundred feet in length, this implies an angular stability of the radar platform (or, conversely, a knowledge of angular position) to a very small fraction of a degree.

It is therefore among the objects of the present invention to provide:

(1) A radar system for use in situations in which there is a high velocity of relative movement between the transmitter and the target area scanned.

(2) A radar system for an artificial satellite or equivalent which can be used in conjunction with other similar devices to maintain a constant surveillance of large target areas such as the oceans of the world.

(3) A radar system for artificial satellites and the like which does not required a giant-sized physical antenna in order to obtain a sufficiently detailed resolution of targets.

(4) A radar system for artificial satellites and the like which employs operating frequencies considerably below those commonly used in other radar systems for equivalent resolution.

(5) A radar system for artificial satellites and the like which can use an extremely simple antenna with rather liberal tolerances.

6) A radar system for artificial satellites and the like which does not require tight control or accurate knowledge of satellite orientation.

(7) A radar system for artificial satellites and the like which does not require high transmitter power.

(8) A radar system for artificial satellites and the like which is light in weight.

These and other objects of the invention which will occur to one skilled in the art upon reading of this specification and examination of the drawings and claims therein, are accomplished in my invention by a radar system which transmits bursts from an oscillator in the frequency range from about 20-250 megacycles and by having a receiver for signals reflected from objects in the target area, which receiver enhances the value of recurrent components of selected time interval portions of said received signals. In one form of the invention the transmitted bursts are modulated in accordance with a predetermined modulation pattern and the receiver includes means for detecting said modulation, determining to what extent it corresponds to the predetermined pattern and then enhancing the value of recurrent components of the received signals, the enhancement being of those recurrent components having relative phases which change by substantially uniform increments.

Figure 1:
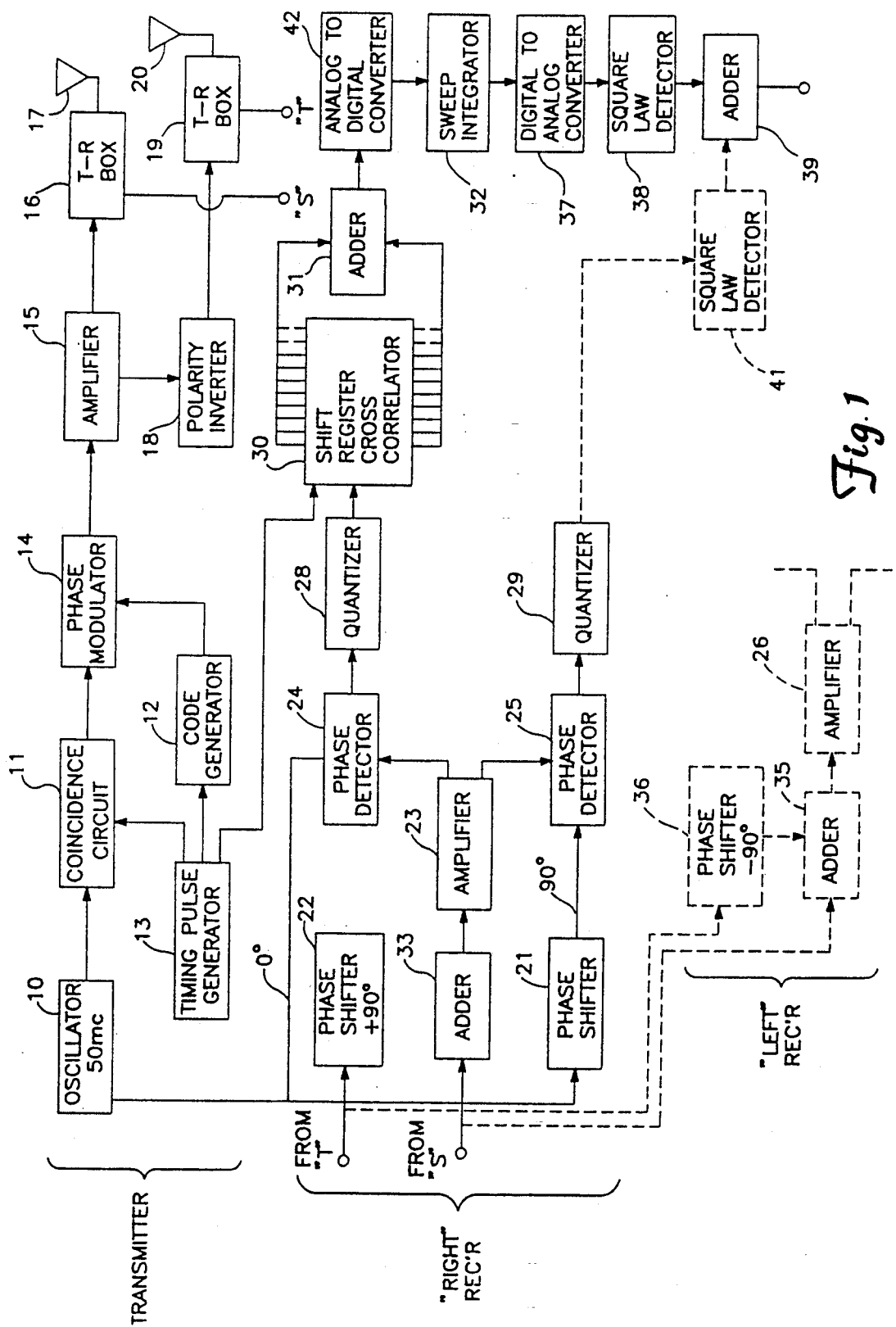
FIG. 1 is a schematic block diagram of an overall transmitter and receiver constructed in accordance with one form of my invention.

Referring to FIG. 1 there is shown a schematic block diagram of a radar system for a satellite or the like which includes a transmitter and a receiver. In accordance with the present invention the range of frequencies that are preferably used is from 20-250 megacycles. This range is chosen to have its lower frequency limited by the fact that the ionosphere will not be penetrated by frequencies lower than 10 megacycles and even below 20 megacycles it is sufficiently non-uniform to seriously limit the resolution. The upper end of the band is limited by the several aforementioned disadvantages of high frequency operation related to antenna precision, power requirement, antenna complexity and so forth. 250 megacycles has been chosen as the upper limit since the attainable resolution limit due to the ionosphere at 250 megacycles is sufficient for most purposes. Satellites requiring higher resolution should be operated at the upper end of the recommended band and satellite systems permitting lower resolution should be operated near the lower end of the band. In order to reduce the peak power requirement of the transmitter without loss of range resolution, the technique known as "pulse compression" may be employed. This involves the use of transmitted pulses having a bandwidth which is large compared to the reciprocal of the pulse duration, and the use of some additional low power components in the receiver. The transmitter would therefore include an oscillator such as the oscillator 10 which produces a signal at, to take an example, 50 megacycles. The 50 megacycle oscillator signal is applied to a coincidence circuit or gate 11 to which pulses from the timing pulse generator 13 are also applied. In a typical embodiment these pulses applied to the coincidence circuit might have a repetition rate of 142 per second and a pulse width of 1023 microseconds. The time interval between the leading edges of two successive pulses would be 7050 microseconds. The coincidence circuit 11 will therefore produce in its output "bursts" of the 50 megacycle carrier at the rate of 142 per second.

These bursts are applied to the input of a conventional phase modulator 14 which modulates each burst by a predetermined code as determined by an input from the code generator 12. The latter may include an 11 stage shift register whose input is the modulo 2 sum of the outputs of its 11th and 9th stages and which is shifted every ½ microsecond by shift pulses originating from the timing pulse generator. This register will produce an identical pseudo-random coding of each of the 1023 microsecond bursts. In a typical arrangement, at the beginning of the gate pulse from generator 13 a "one" pulse is introduced into the first stage of the register, all other stages being then at zero. At the end of the gate pulse all of the stages of the register are reset to "zero".

The phase modulator operates to cause the phase of the 50 megacycle carrier to be 0°, for example, when the code calls for a "one" and 180° when it calls for a "zero."

Figure 2:
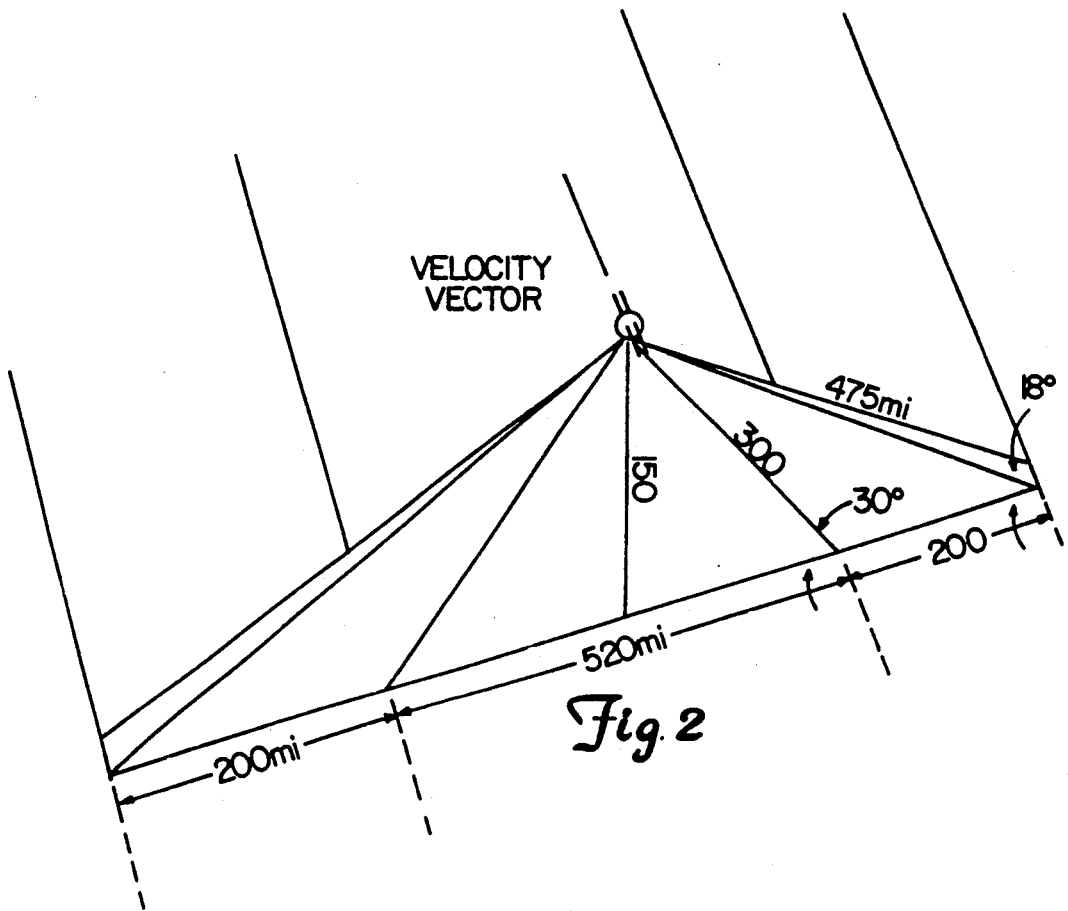
FIG. 2 is a schematic representation of a satellite employing my novel radar system and showing in particular the target area illuminated by the antennas thereof.

The output of phase modulator 14 is applied to a transmitter amplifier 15 whose construction may be conventional. One of its outputs is applied to a T-R box 16, which may be of conventional construction, and thence to an antenna 17. Another output of the amplifier 15 is applied via a polarity inverter 18 and other T-R box 19 to a separate antenna 20. For an orbit height of 150 nautical miles these antennas can each be approximately 340 feet long and each be energized so as to produce a broadside array pattern. The antennas are parallel and could be separated by approximately ¼ wavelength or 5 feet at 50 megacycles. They are energized simultaneously though 180° out of phase with one another and illuminate simultaneously two ground paths on each side of the satellite, each path being about 200 miles wide. With a 520 mile gap between them as shown in FIG. 2. The maximum range to the furthest point in the scanning pattern would be about 400 miles.

Antennas suitable for the above-described purpose are known and a particular form thereof is hereby described in a subsequent portion of this specification.

All but the initial amplifiers of the receivers for the radiation reflected back into the antennas 17 and 20 may either be on the ground or on board the satellite. For convenience of explanation there has been shown in FIG. 1 an embodiment in which all the signal processing equipment employed to derive the useful radar information from the signals picked up by the radar antennas is located on board the satellite.

Echo signals from Point "S" will be applied to one input of adders 33 and 35. Echo signals from Point "T" will be respectively applied via phase shifters 22 and 36 to the other inputs of the adders 33 and 35. The sum signals will be respectively applied to amplifiers 23 and 26. The amplifier 23 and the circuits coupled to it on the right will produce signals representative of echos received from right lobe scanning pattern. The "left" amplifier 26 which is shown in phantom will be connected similarly to circuits to the right of it (not shown) and will process the echos received from the left lobe scanning pattern. To clarify the explanation of the invention, however, only the apparatus and signals processed in the "right" channel will be discussed in detail, it being understood that the same explanation and considerations are involved in the operation and construction of the circuits connected to amplifier 26.

RECEIVERS

Signals received from the T-R box 16 and signals from antenna 20 via phase shifter 22, are amplified by the amplifier 23 and then applied to mixers 24 and 25. These mixers may be coherent phase detectors to which the 50 megacycle signal is applied from the oscillator 10 and a 90° phase shifted signal is applied from the oscillator via the phase shifter 21. The signals produced in the outputs of the mixers 24 and 25 are bipolar video signals. In order to be able to use certain digital techniques as explained later it is desired to convert these signals to a digital form. To accomplish this they are applied to quantizers 28 and 29 which may be simply Schmitt trigger circuits of conventional construction. These quantizers are essentially one bit quantizers, that is to say they detect whether the signals applied thereto are positive-going or negative-going, and produce a uniform-amplitude positive output whenever the input signal is positive and a zero output whenever the input signal is negative. The outputs of the quantizers are then applied to shift registers and cross correlators in the respective channels such as the cross correlator 30 where they are in essence compared with the original code, to determine the extent to which it contains pulse trains corresponding to the initial code.

It will be remembered that the original 1023 microsecond pulse was chopped up into a coded sequence as part of the "pulse compression" technique used at the transmitter. The output signal of the quantizer 28 is applied to all of constituent units or cells of the register 30 in sequence. There will be 2046 units in the register with an output lead connected either to the "one" or "zero" side of each unit depending upon the particular code generated by the generator 12 in the transmitter. All "one" output leads will be joined to a common bus which feeds one input of adder 31. Similarly, all of the "zero" output leads are connected to a common bus and applied to the other input of the adder 31.

The shift register may be of any conventional type such as ferrite core construction, for example. The position of each bit of the output signal of the quantizer 28 is shifted along the register in response to a shift pulse occurring every half microsecond provided by the timing pulse generator 13. As the signal from the quantizer is shifted down the register, a comparison of the match of the latter signal against the wired-in code produces signals which, when processed by the adder 31, will have a maximum amplitude of 2046 amplitude units when there is full positive correlation, will have an amplitude of zero amplitude units when there is full negative correlation and will have an average amplitude of about 1023 units when there is a random correlation.

The combination of correlator 30 and adder 31 in effect serves to remove from the received signal the effect of the coding operation performed on the transmitted signal by coincidence circuit 11 and phase modulator 14. Whereas these latter circuits produced transmitted pulse segments of randomly varying phase, the correlator and adder removes these phase variations and also superposes in time ("stacks up") the differently phased segments of each transmitted pulse. This segmental phase coding performed at the transmitter prevented the signal at the output of phase detector or mixer 24 from being a single series of pulses, representing echoes from targets (if any) and modulated in amplitude at the Doppler rate associated with the phase shift due to relative motion between satellite and target. With the effect of this segmenting and phase coding removed, the output of adder 31 will consist of a series of pulses of variable amplitude (number of units) fluctuating from one extreme of 2046 units to another of zero units. The presence of such pulses of amplitude substantially different from their random correlation value of 1023 units denotes the reception of reflections from targets whose ranges are represented as usual by the time which elapses between the transmission of a given radar pulse and the occurrence of a corresponding echo pulse. When such target reflections are being received, the amplitude of the pulses representing them will undergo a fluctuation at the Doppler frequency rate associated with the relative motion of radar platform and targets. These signals with their fluctuations due to the Doppler shift are supplied to a sweep integrator 32. This sweep integrator compares the echo signals received from a selected number of successive transmitted coded bursts. This comparison is done by adding or integrating about 36 echo signals at a time. In phase "range bins" in which the target is located, those portions of the echo signals which have substantially the same phase tend to add constructively whereas non-target echos will tend to cancel out. Thus the antenna lobe pattern is effectively considerably narrowed.

Figure 3:
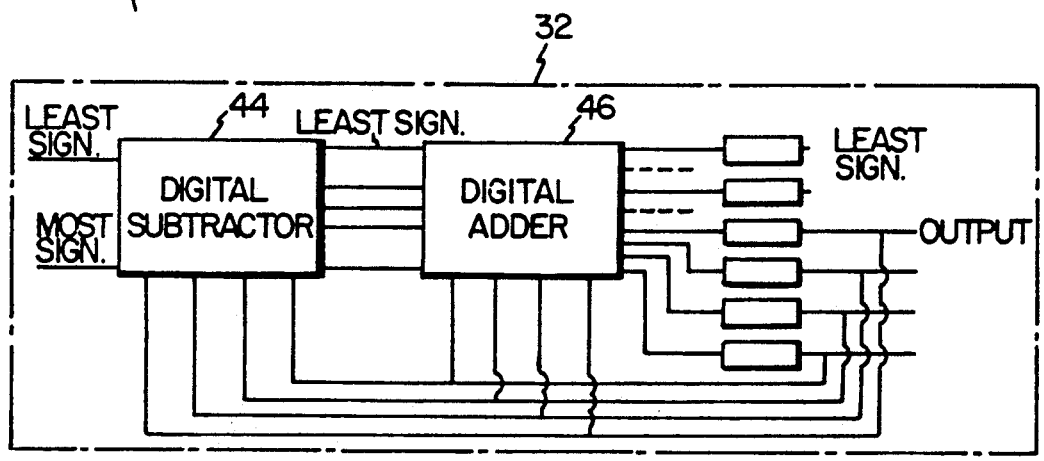
FIG. 3 is a block diagram of one of the components in the receiver portion pictured in FIG. 1.

The sweep integrator shown in FIG. 3 is one which may be used in this system. It will be remembered that the output wave of the adder 31 includes a single pulse of a half microsecond duration whose amplitude will be well above the noise and clutter when a target range is detected. This signal is first applied to a conventional analog-to-digital converter 42 which produces an output signal having two bits. This signal is applied to a digital subtracting circuit 44 where the four most significant digits which have been delayed (as shown) after the output of the adder 46 are subtracted from it. By subtracting these delayed four most significant digits the oldest information in the integrator is continuously being eliminated while more current information is continuously being added therein. The output of the subtractor 44 is chosen to have five bits of information so that its signal can represent values up to 32. All of the output signals of adder 46 are delayed in the delay lines connected to each output lead as shown. These delay lines may be constructed to introduce a delay equal to the interpulse interval at the transmitter. The delayed output signals are added in adder 46 to the five bit input signal thereto. A four bit input is taken from the four most significant delayed output signals from adder 46. In this way, target echos in corresponding bins of successive traces will add constructively when the targets causing those echos reach an angular position relative to the radar platform that produces constant phase echos and will combine destructively or tend to subtract from one another at other angular positions of those targets.

It should be appreciated that the mixer 24 and its following circuits merely process information from the components of the echo signals which are substantially in phase with the transmitted oscillatory wave whereas the mixer 25 and its following circuits contain and process information from the component of the echo signals which are substantially in quadrature thereto. The mixer 25 and its following circuits are not absolutely indispensable to the proper functioning of this system, but the use of a quadrature channel increases the signalto-clutter and signal-to-noise ratio. In order to obtain a signal which is the resultant of the processed quadrature components, the output of the sweep integrator 32 is applied to a digital-to-analog converter 37 whose output signal is applied to a square law detector 38 which supplies one input to an adder 39. The square law detector 41 of the quadrature channel applies the corresponding squared processed quadrature component to the adder 39. The adder 39 produces a siginal representative of the amplitude of the resultant vector and this signal is applied to the radar indicator or equivalent.

The antennas 17 and 20 of FIG. 1 may be of the so-called "Stem" type as described in a Data Sheet 61-21 "Stem Devices" and in News Release No. 2862 distributed by De Havilland Aircraft of Canada, Ltd. These antennas consist of a flexible tape which is rolled up and stored in a flat position but when unrolled forms a tube. Typically they may weigh one 1/100th of a pound per foot and have been built as long as 900 feet in length. To produce a broadside array pattern at 50 megacycles each 340 foot antenna would consist of 34 colinear segments each about ten feet long and each electrically insulated from each other. With "Stem" antenna construction, the flexible tape could be of an insulated and springy material such as fiberglass conductively coated at appropriate locating. Each separate 10 foot segment should be excited to resonate as a half wavelength dipole, all dipoles in each of the two antennas being in phase with each other. The separate dipoles could be driven by a feed line running down the center of the "Stem" antenna. As stated above, each of the antennas of the illustrative frequency chosen is 340 feet long and arranged and energized as a broadside array so as to eliminate the Doppler ambiguity discussed above. Preferably the angle enclosing each of the side lobes should not exceed 7°-10° at 50 megacycles so that a pulse echo representing a ship will not appear in several places in the presentation. The axes of the antennas are both arranged in flight to be approximately parallel to the direction of the movement of the satellite. While broadside array is one possible arrangement, it is possible that long wire end-fire antennas may alternatively be used. Each antenna has a gain of 18 db and generally speaking, the alignment of the antennas with the velocity vector should be stabilized within certain bounds, i.e., plus or minus thirty degrees. The alignment or misalignment of the antenna with respect to the velocity vector should be known to within three degrees for a carrier of 100 megacycles and to within twelve degrees for a carrier at 25 megacycles.

It should be appreciated that the embodiment of this invention pictured in FIG. 1 and described in the above discussion is but one particular embodiment of my invention and that many other embodiments are possible. For instance, the positions of the cross correlator and the sweep integrator shown in FIG. 1 can be interchanged with certain minor readjustments. As a second example, the cross correlator need not be a digital device such as a shift register but could be an analog device such as a delay line with appropriate taps. The sweep integrator need not be digital but also can be in analog form such as an F-M or even a cathode-ray tube sweep integrator. There need not be two separate sweep integrators to handle the aforementioned two quadrature components but instead one sweep integrator can be constructed to handle both components if one of the signals entering mixer 24 is shifted in frequency by one or more megacycles with respect to the other by a heterodyne process.

An alternative embodiment of the integrator might be constructed at R. F. without the use of the bipolar-video and binary quantizer.

Other forms of pulse coding such as "CHIRP" and product codes may be utilized without changing the basic properties of the system.

Due to the use of efficient signal coding it is possible to locate most of the data processing system on the surface of the earth or aboard ship and relay the coded signals via radio link to the surface units prior to processing to increase the reliability and reduce the size and weight of the satellite-borne equipment.

Figure 4:
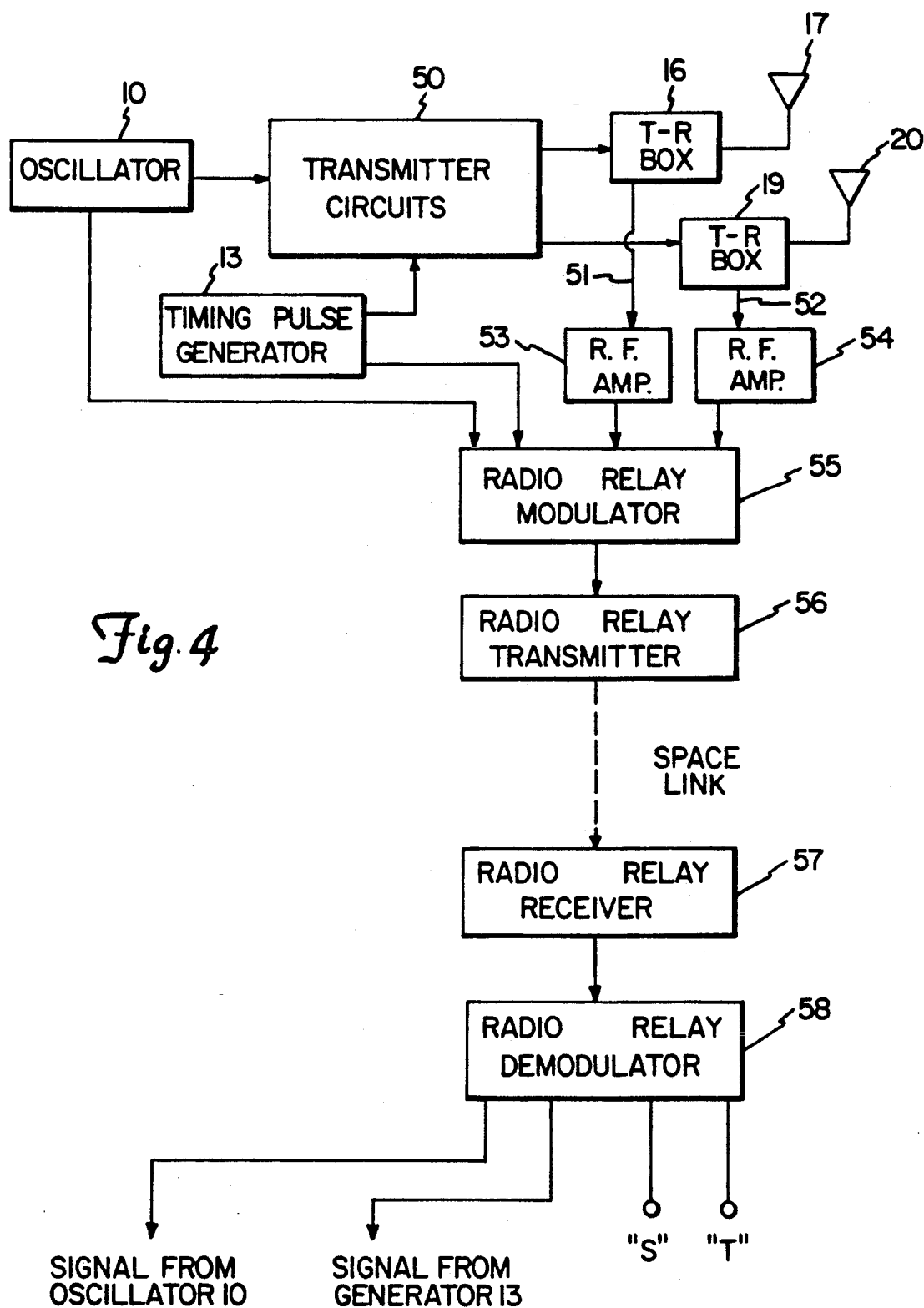
FIG. 4 is a block diagram showing certain portions of the apparatus of FIG. 1 located remotely from each other and the apparatus coupling these portions to each other.

FIG. 4, to which reference may now be had, shows one way in which this relaying of signals to the ground may be accomplished.

In this figure, the oscillator 10, timing pulse generator 13, T-R boxes 16 and 19, and antennas 17 and 20 all correspond to the correspondingly numbered elements of FIG. 1. Moreover the block designated by reference numeral 50 in FIG. 4 contains all the elements shown in FIG. 1 as being connected intermediate oscillator 10 and T-R boxes 16 and 19.

The above-described equipment of FIG. 4 operates in the same manner as the corresponding portions of FIG. 1. As a result, there will be produced in the system of FIG. 4 on leads 51 and 52, respectively, signals corresponding to those produced at terminals "S" and "T" of FIG. 1. These signals are the signals received by antennas 17 and 20, respectively, in response to transmitted signals derived from oscillator 10 as explained in detail in connection with FIG. 1.

Instead of being supplied directly to the signal processing circuits of the receiver (as in FIG. 1), the signals on leads 51 and 52 are supplied to conventional R.F. amplifiers 53 and 54, respectively, which amplify them in conventional manner. The resultant amplified signals are then supplied to a radio relay modulator 55, together with signals derived, respectively, from oscillator 10 and generator 13.

This modulator 55, which may be of any of various known forms, accepts the signals supplied thereto and puts them into a form in which they are suitable for transmission from a conventional radio relay transmitter 56. The equipment described up to this point is, of course, all located aboard the satellite or other radar platform.

The output from this transmitter is then radioed to a ground station where it is received by a conventional radio relay receiver 57. The output from this receiver is supplied to a conventional radio relay demodulator 58 which recovers the four signals supplied to the modulator 55 as described above. The resultant four output signals are then further processed by equipment, also located on the ground, and which may be identical to the equipment to which corresponding signals are supplied in the embodiment of FIG. 1.

As has been previously pointed out, in systems embodying the instant invention, the phase relationships between the various transmitted, received, and timing signals are of great importance and, accordingly, the particular radio relay equipment used should be such that these phase relationships will be preserved and should still exist, substantially unaltered, between the signals reproduced at the outputs of decoder 58.

It will now be recognized that the only change in the equipment of FIG. 1 necessitated by the separation of the equipment into ground and satellite based portions is the provision of conventional R.F. amplifiers and conventional radio relay equipment.

It will also be apparent that a system such as shown in FIG. 1 may also be divided into ground and satellite based portions at other points within the system by the introduction of suitable radio relay equipment, and added amplification if needed, at such other points.

It should be further realized that the embodiment portrayed in FIG. 1 achieves fine azimuthal resolution by enhancing the echoes from targets at the interval time when the target is located in an azimuthal position with respect to the radar platform that returns successive echoes of constant phase. If the one of the signals entering phase detector 24 differs in frequency from the other signal by a few cycles per second or by a few tens of cycles per second, the system then enhances echo signals with a uniform phase progression from pulse to pulse. In the latter case the effective high resolution beam corresponds to a different portion of the target area.

I claim:

1. A radar system comprising:
   (a) means for transmitting bursts of an oscillatory carrier wave in the frequency range from about 20–250 megacycles, said bursts being modulated in accordance with a predetermined modulation pattern,
   (b) means for detecting the modulation of received signals corresponding to said transmitted signals, said received signals having been reflected by objects from the target area,
   (c) means responsive to said detected modulation for determining to what extent said detected modulation corresponds to said modulation pattern,
   (d) means responsive to said received signals for combining portions of said signals received during different time intervals so as to enhance the value of regularly recurrent components in said portions of said received signals.

2. The radar system according to claim 1 wherein there is substantial velocity of said target area relative to said transmitting means whereby the phase of said reflected signals is subjected to incremental changes and wherein said portions are combined during periods during which the phase of said signals changes by substantially uniform increments.

3. The radar system according to claim 2 wherein said velocity is at least on the order of the minimal orbital velocity of an earth-orbiting artificial satellite.

4. The radar system according to claim 1 wherein said transmitting means and said receiving means are connected to said object and wherein said combining means is located remote therefrom.

5. The system according to claim 4 characterized in that said transmitting and receiving means are both located at said object.

6. The system according to claim 5 further comprising a radio link coupling said means located at said object to said means located remote therefrom.

7. The radar system according to claim 1 wherein said transmitting means includes means for coding said transmitted bursts in accordance with a predetermined code and wherein there are additionally provided means for detecting said code in said reflected signals, means for comparing the extent to which said detected code corresponds to said predetermined code, and wherein said detecting, comparing, and enhancing means are located remote from said object.

8. The system according to claim 1 wherein said regularly recurrent components have respective phases which are subject to change and wherein said means (d) is operative during periods during which said phases change by substantially uniform increments.

9. The system according to claim 8 wherein said increments may be substantially zero.

10. A radar system comprising:
    (a) means for producing bursts of a carrier wave having a frequency within the range from about 20–250 megacycles,
    (b) means for modulating selected ones of said bursts in accordance with a predetermined code,
    (c) means for transmitting said coded bursts,
    (d) means for receiving and amplifying those of said transmitted coded bursts which are reflected by objects in a target area,
    (e) means for demodulating said received signals,
    (f) means responsive to said demodulated signal for producing uniform amplitude pulses,
    (g) digital means to which said uniform pulses are applied for producing a first signal whose instantaneous amplitude is a function of the extent to which said pulses correspond to said code, and
    (h) means to which said first signal is applied for enhancing the value of components therein which recur regularly in selected successive time-interval portions of said first signal, said enhancing means producing a second signal whose maxima correspond to those of said components which have relative phases that change by substantially uniform increments.

* * * * *